United States Patent
Farnsworth et al.

(10) Patent No.: US 8,682,333 B2
(45) Date of Patent: *Mar. 25, 2014

(54) WIRELESS TELECOMMUNICATION SYSTEM

(75) Inventors: Andrew John Farnsworth, Bromsgrove (GB); David W. Pedlar, Coventry (GB); Gjalt Gerrit de Jong, Leuven (BE)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/340,888

(22) Filed: Dec. 30, 2011

(65) Prior Publication Data

US 2012/0108242 A1    May 3, 2012

Related U.S. Application Data

(63) Continuation of application No. 13/012,531, filed on Jan. 24, 2011, now Pat. No. 8,090,375, which is a continuation of application No. 12/276,066, filed on Nov. 21, 2008, now Pat. No. 7,899,461, which is a continuation of application No. 10/674,109, filed on Sep. 29, 2003, now Pat. No. 7,471,948.

(51) Int. Cl.
*H04W 40/00* (2009.01)

(52) U.S. Cl.
USPC ........ 455/445; 455/450; 455/433; 455/435.1; 455/414.1; 455/412.1

(58) Field of Classification Search
USPC ........ 455/432.1, 432.2, 450, 509, 436, 435.1, 455/445, 433, 414.1, 412.1; 370/310, 254, 370/338, 329
See application file for complete search history.

(56) References Cited

U.S. PATENT DOCUMENTS

| | | | |
|---|---|---|---|
| 6,606,498 B2 | 8/2003 | Chen et al. | |
| 6,721,566 B2 | 4/2004 | Longoni et al. | |
| 6,898,429 B1 * | 5/2005 | Vialen et al. | 455/432.1 |
| 7,274,935 B2 | 9/2007 | Balachandran et al. | |
| 7,406,314 B2 * | 7/2008 | Sharma | 455/445 |
| 7,471,948 B2 * | 12/2008 | Farnsworth et al. | 455/432.1 |
| 7,899,461 B2 * | 3/2011 | Farnsworth et al. | 455/450 |
| 8,090,375 B2 * | 1/2012 | Farnsworth et al. | 455/437 |
| 2003/0050097 A1 * | 3/2003 | Amirijoo et al. | 455/560 |
| 2003/0139183 A1 * | 7/2003 | Rantalainen | 455/435 |
| 2003/0211846 A1 | 11/2003 | Nagpal et al. | |
| 2004/0068571 A1 | 4/2004 | Ahmavaara | |
| 2004/0147262 A1 | 7/2004 | Lescuyer et al. | |
| 2004/0224686 A1 * | 11/2004 | Pedlar | 455/435.1 |
| 2004/0248581 A1 | 12/2004 | Seki et al. | |

(Continued)

OTHER PUBLICATIONS

Sharma, "Method for Handling of Transition Out of Paging Channel User Equipment (PCH UE) States in Universal Mobile Telecommunication System (UMTS)", Jul. 11, 2003, fig. 1-5, pp. 1-9 (U.S. Appl. No. 60/486,584).

*Primary Examiner* — Khai M Nguyen

(57) ABSTRACT

A method and apparatus for processing a message in a mobile, telecommunications device. The method comprises: receiving a Cell Update Confirm (CUC) message; determining whether the device has an empty C_RNTI variable; when the device has an empty C_RNTI variable, determining whether the CUC message includes a new C_RNTI; when the CUC message includes a new C_RNTI and the CUC message would cause the device to enter a state which requires the UE to respond to the message before entering the state, carrying out at least one further step prior to entering the state.

17 Claims, 6 Drawing Sheets

(56) References Cited

U.S. PATENT DOCUMENTS

| | | | |
|---|---|---|---|
| 2005/0009527 A1* | 1/2005 | Sharma | 455/445 |
| 2008/0233950 A1* | 9/2008 | Kuo | 455/424 |
| 2009/0197589 A1 | 8/2009 | Kitazoe | |
| 2010/0118811 A1 | 5/2010 | Lee et al. | |
| 2011/0194437 A1* | 8/2011 | Song et al. | 370/252 |
| 2012/0064903 A1* | 3/2012 | Pani et al. | 455/450 |

* cited by examiner

WIRELESS TELECOMMUNICATION SYSTEM

CROSS REFERENCE TO RELATED APPLICATION

The present application is a continuation application of U.S. patent application Ser. No. 13/012,531, filed on Jan. 24, 2011, which is a continuation of U.S. patent application Ser. No. 12/276,066, filed on Nov. 21, 2008, now U.S. Pat. No. 7,899,461, which is a continuation of U.S. patent application Ser. No. 10/674,109, filed on Sep. 29, 2003, now U.S. Pat. No. 7,471,948. These prior applications are hereby incorporated into the present application by reference.

FIELD OF THE INVENTION

The present invention relates to the file of telecommunications and particularly to the area of wireless telecommunication systems.

BACKGROUND OF THE INVENTION

In a typical cellular radio system, mobile user equipment (UE) communicates via a radio access radio network (RAN) to one or more core networks. User equipment (UEs) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

The radio access network covers a geographical area divided into a plurality of cell areas. Each cell area is served by at least one base station, which may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

An example of a radio access network is the Universal Mobile Telecommunications System (UMTS) Terrestrial Radio Access Network (UTRAN). UMTS is a third generation mobile communication system and essentially relates to a wide band code division multiple access (W-CDMA) system.

W-CDMA technology allows simultaneous communication between user equipment and a plurality of base stations using a common frequency band. Signals occupying a common frequency band are discriminated in the receiving base station through spread spectrum CDMA waveform properties based on the use of a high speed, pseudo-noise (PN) code. These high speed PN codes are used to modulate signals transmitted from the base stations and the user equipment. A transmitting station uses a PN code to produce signals that can be separately demodulated at a receiving station. In CDMA therefore a user equipment unit need not switch frequency when handover of the connection is made from one cell to another. Thus, a destination cell can support a connection to the user equipment at the same time as the original cell continues to provide service. Since the UE is always communicating through at least one cell during hand over, there is no disruption to the call.

There are several interfaces defined in the UTRAN. In some instances a connection involves both a serving or source RNC (SRNC) and a target or drift RNC (DRNC), with the SRNC controlling the connection but with one or more diversity legs of the connection being handled by the DRNC. UMTS has both common transport channels and dedicated transport channels. Common transport channels include the random access channels (RACH), the forward access channel (FACH), the common packet channel (CPCH) and the downlink shared channel (DSCH). Dedicated transport channels include the dedicated channel (DCH). These transport channels are described for example in one or more of the following specifications:

ETSI TS 125.211 Version 3.12.0 "Physical Channels and Mapping of Transport Channels on to Physical Channel (FDD)";

ETSI TS 125.221 Version 3.11.0 "Physical Channels and Mapping of Transport Channels on to Physical Channel (TDD)";

ETSI TS 125.331 Version 3.15.0 "Radio Resource Control (RRC) Protocol Specification.

When switching from a dedicated to a common channel in UMTS, the UE is assigned a temporary identifier known as C-RNTI (Cell Radio Network Temporary Identifier). This temporary identifier C-RNTI is specific to a cell and is valid in the cell where the UE uses resources. The C-RNTI is used to distinguish between different user equipment in that cell.

When switching from dedicated channels to common channels, the network can assign the radio resources to be used only if the UE is in a cell under control of the serving SNC (SRNC). In other words, if the UE is in a cell under the control of a drift RNC (DRNC) rather than SRNC, it is not possible for the network to assign the radio resources to be used when switching from dedicated channels to common channels. This results in longer signalling sequences between the UE and the network as well as additional delay when switching from dedicated channels to common channels. The UE itself must obtain the temporary identifier C-RNTI by additionally signalling between the UE and UTRAN before continuing to communicate with the network. Furthermore, the lack of information regarding which range of resources to use means that the UE needs to detect and read information about the range of resources and the broadcast channel in the cell before accessing the cell. This again incurs additionally delay when switching from dedicated channels to common channels.

BRIEF DESCRIPTION OF DRAWINGS

The present invention is illustrated by way of example, and not by way of limitation, in the figures of the accompanying drawings and in which like reference numerals refer to similar elements and in which.

The needs identified in the foregoing Background, and other needs and objects that will become apparent from the following description, are achieved by, in one aspect, a method for processing a message in a mobile telecommunications device. The method comprises, on receipt of a Cell Update Confirm (CUC) message, determining whether the device has an empty cell identifier variable e.g. C_RNTI. When the device has an empty cell identifier variable, it is determined whether the CUC message includes a new cell identifier e.g. C-RNTI. If this is the case, and the CUC message would cause the device to enter a state which requires the UE to respond to the message before entering the state, at least one further step is carried out prior to entering the state.

In other aspects, the invention encompasses apparatus and a computer-readable medium configured to carry out the foregoing steps. In particular, the method may be implemented in a mobile telecommunications device, with or without voice capabilities, or other electronic devices such as handheld or portable devices.

Figure 1:
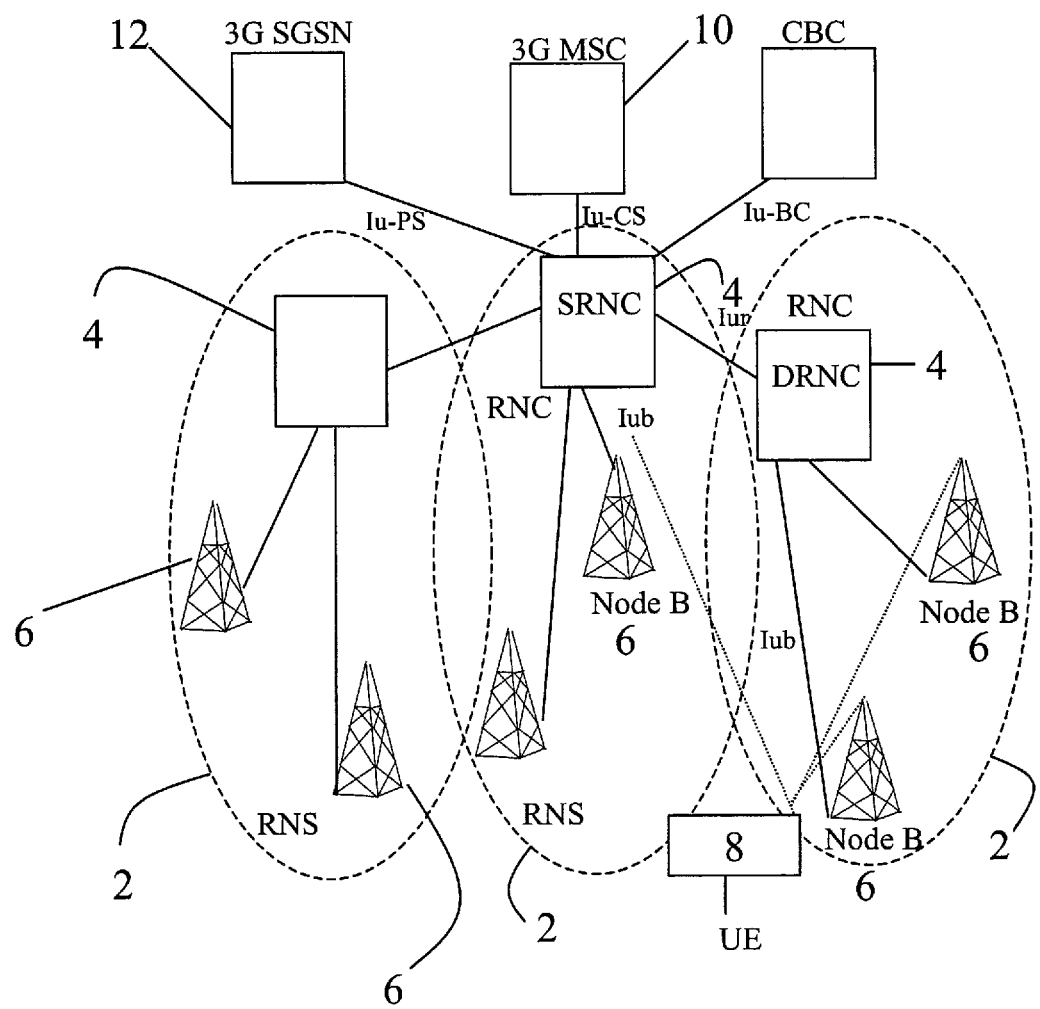
FIG. 1 shows a schematic diagram of a radio access network system.

FIG. 1 shows an overview of the radio access network (UTRAN) used in a UMTS system. The network as shown in FIG. 1 comprises three Radio Network Subsystems (RNS) 2. Each RNS has a Radio Network Controller (RNC) 4. Each RNS 2 has one or more Node B 6 which are similar in function to a Base Transmitter Station of a GSM radio access network. User Equipment UE 8 may be mobile within the radio access network. Radio connections (indicated by the straight dotted lines in FIG. 1) are established between the UE and one or more of the Node Bs in the UTRAN.

A radio network controller RNC controls the use and reliability of the radio resources within the RNS. Each RNC is also connected to a 3G mobile switching centre 10 (3G MSC) or a 3G serving GPRS support node 12 (3G SGSN).

An RNC controls one or more Node B's. An RNC plus its Node B's together make up an RNS. A Node B controls one or more cells. Each cell is uniquely identified by a frequency and a primary scrambling code (primary CPICH in FDD, primary CCPCH in TDD).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link.

C-RNTI, the Cell Radio Network Temporary Identity, is a UE identifier allocated by the controlling RNC and it is unique within one cell controlled by the allocating CRNC. C-RNTI can be reallocated when a UE accesses a new cell with a cell update procedure. C-RNTI is used as a UE identifier in DCCH/DTCH common channel messages on the radio interface.

Figure 2:
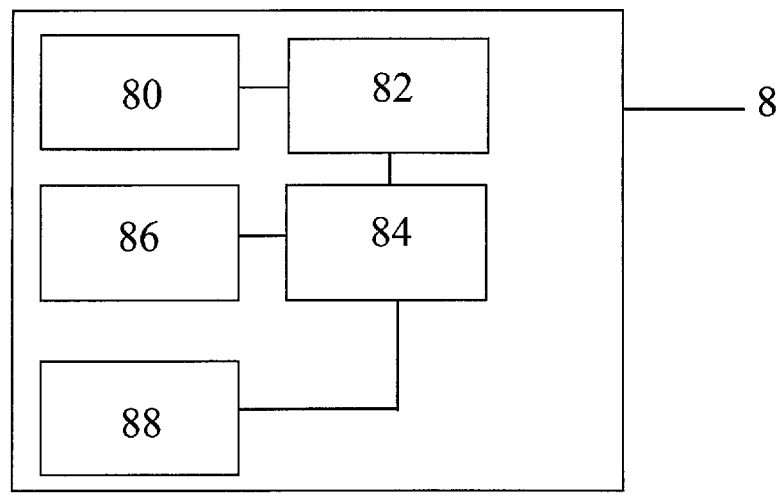
FIG. 2 shows the components of a user equipment used with the radio access network system of FIG. 1.

FIG. 2 shows a schematic diagram of various components of UMTS user equipment. The UE 8 includes an antenna 80 and a transceiver 82 for transmitting and receiving radio signals. In the Time Division Duplux (TDD) mode of UMTS, the transceiver 82 may use a rake receiver to establish the signal to be operated on by the UE. The transceiver 82 is connected to a processor 84 which processes the signals received by and sent by the transceiver. The processor 84 has connections to memory 86 and a user interface device 88 (such as a keyboard and/or a screen). FIG. 2 only shows the main components of the UE. Clearly the UE will include other components which are not shown but which are not relevant for the present understanding.

Figure 3:
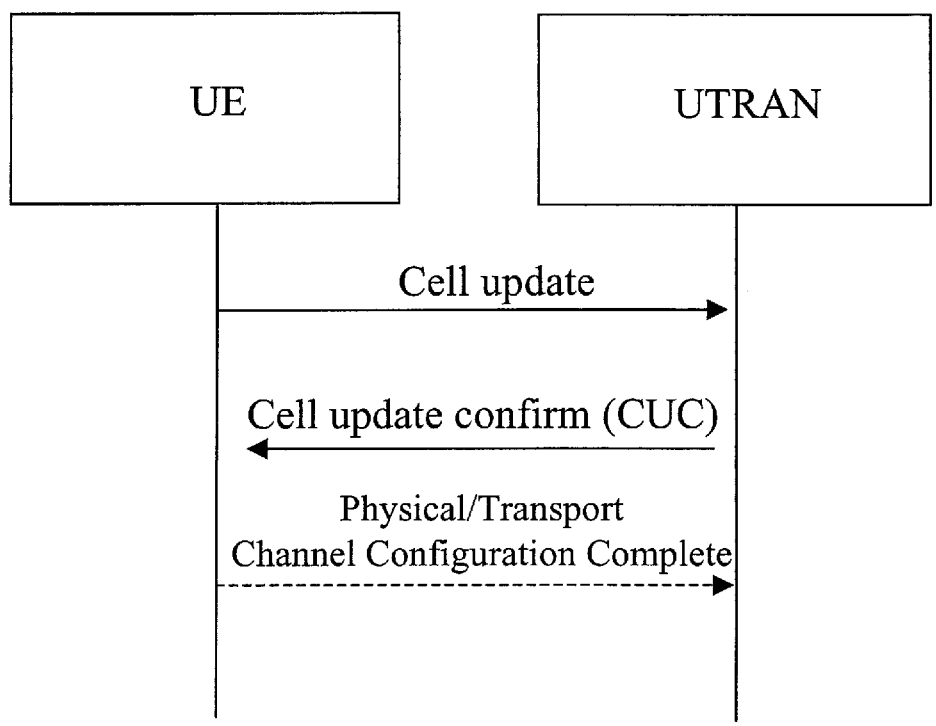
FIG. 3 illustrates the cell update procedure used with a radio access network system as shown in FIG. 1.

FIG. 3 shows the cell update procedure in UMTS. Firstly the UE sends a cell update to the UTRAN. ETSI TS 125.331 Version 03.15.00 Section 8.3.1.5 describes what occurs at the UTRAN when the UTRAN receives a cell update message from a UE. Among other things, the UTRAN transmits a cell update confirm (CUC) message. ETSI TS 125.331 Version 03.15.00 Section 8.3.1.6 describes the operation of the UE on reception of a cell update confirm message from the UTRAN. The UE may in response send a Physical or Transport Channel Configuration Complete message or any other suitable message or possibly no response message.

Figure 4:
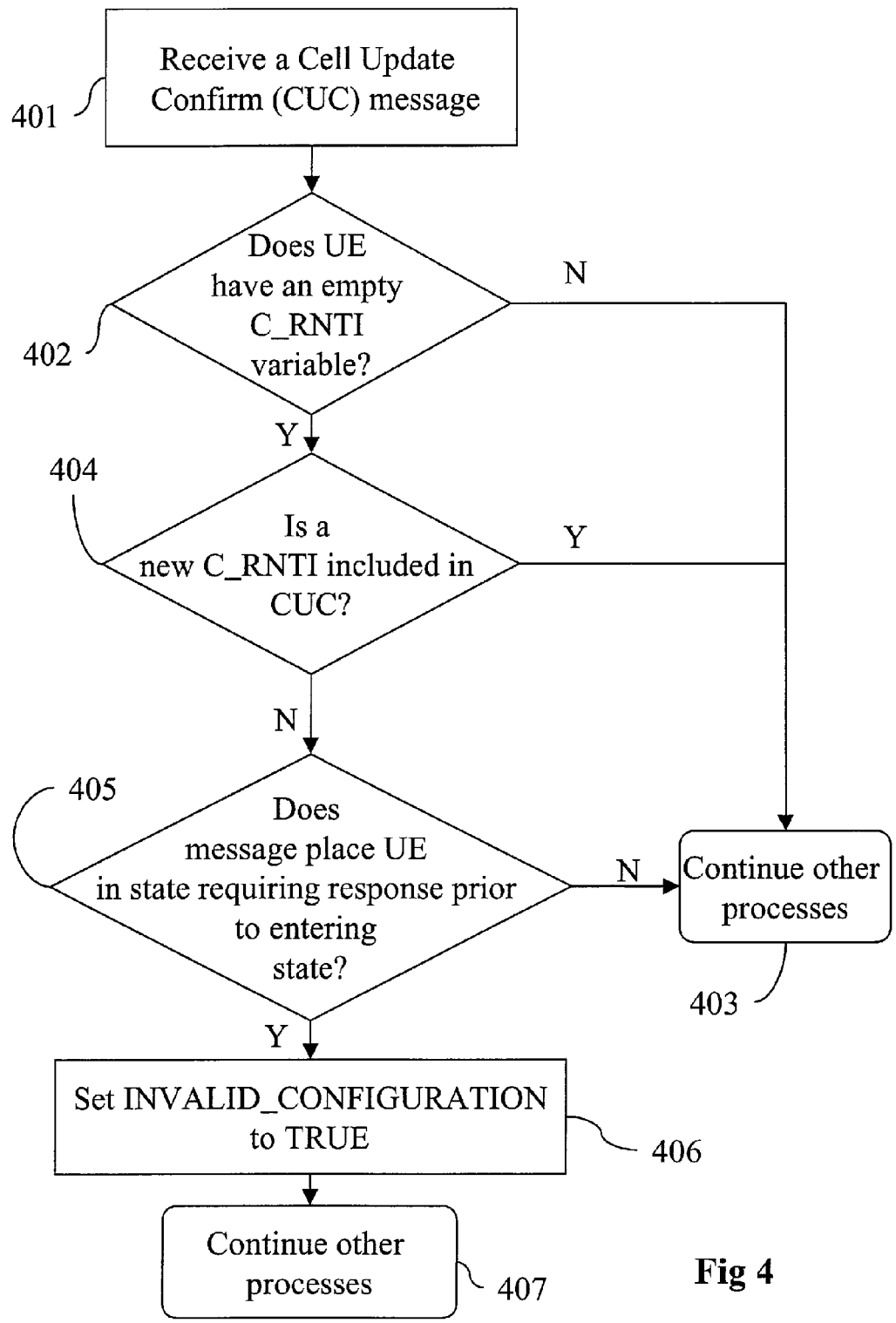
FIG. 4 is a flow chart illustrating the operation of a first embodiment of a system.

FIG. 4 is a flow diagram illustrating one example of how the UE may react to receiving a CUC message. On receipt (step 401) of a cell update confirm message, firstly the UE checks (step 402) whether the C_RNTI variable of the UE is empty. If not, the UE carries out further processes (step 403) which will not be discussed further. However, should the C_RNTI variable be empty, the UE then checks whether a new C-RNTI is included in the received CUC message (step 404). If a new C-RNTI is included in the CUC message, the UE continues with other processes (step 403) which will not be discussed further. However, should the CUC not include a new C-RNTI then the UE checks whether the CUC message would place the UE in a state requiring a response prior to entering the state (step 405). If this is not the case, the UE continues to further processes which will not be discussed further. However, if the CUC message does place the UE in a state that requires a response prior to entering the state, the UE takes further action as set out in step 406.

As shown in FIG. 4, this step 406 comprises setting the variable INVALID_CONFIGURATION to TRUE thus the processing of the CUC message is aborted. The UE then may continue with further processes (step 407) such as sending a subsequent cell update message to the UTRAN or returning to idle. This decision may depend on the value of V302 and N302 as described in Section 8.3.1.9 of ETSI TS 25.331 Version 3.15.0.

Figure 5:
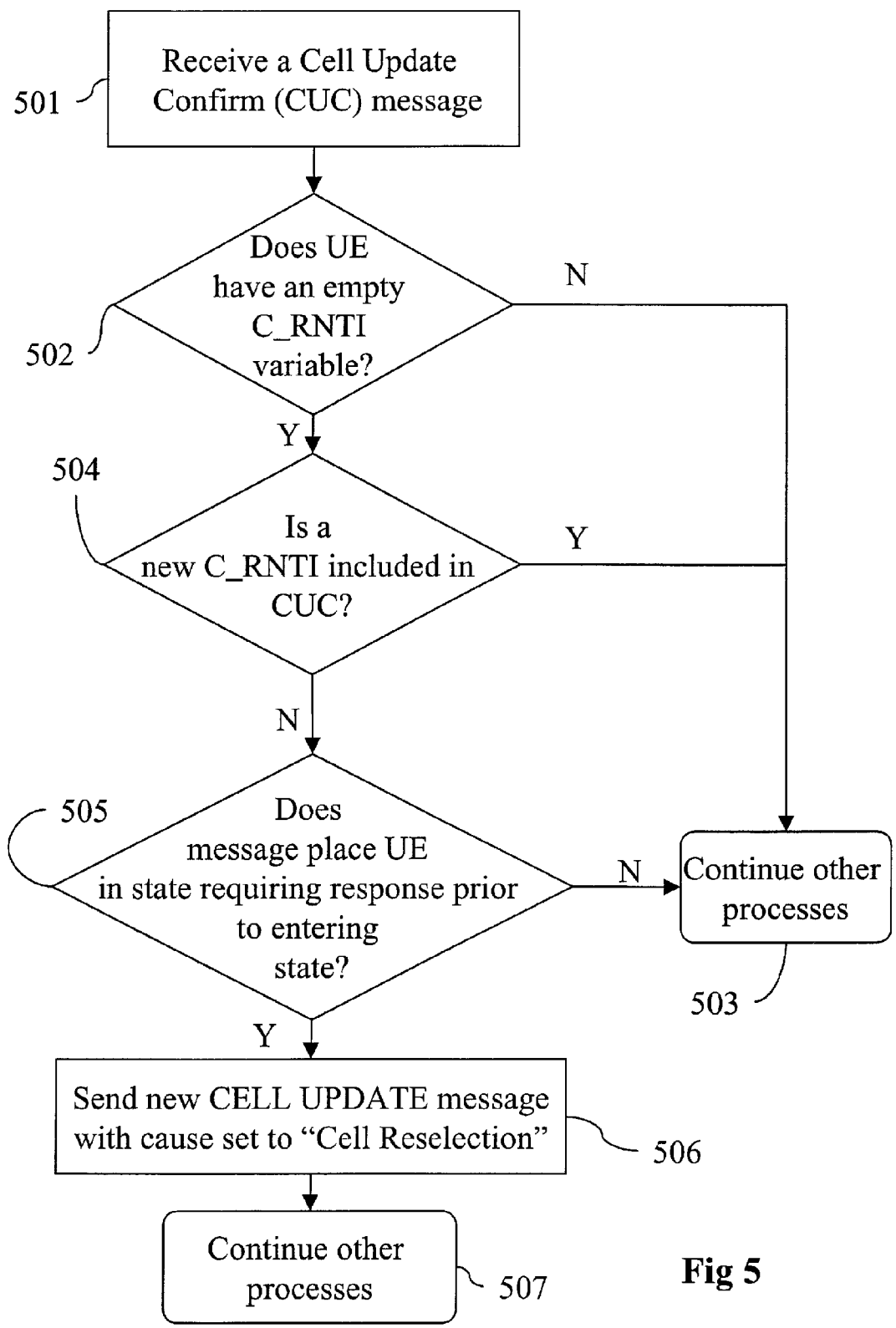
FIG. 5 is a flow chart showing a second embodiment of the system.

FIG. 5 shows a further embodiment. Steps 501, 502, 503, 504 and 505 are the same as steps 401 to 405 described with reference to FIG. 4. However, as shown in FIG. 5, in this embodiment when a message would place the UE in a state requiring response prior to entering the state (step 505), then the UE sends a new cell update message with the cause set to "cell reselection".

Figure 6:
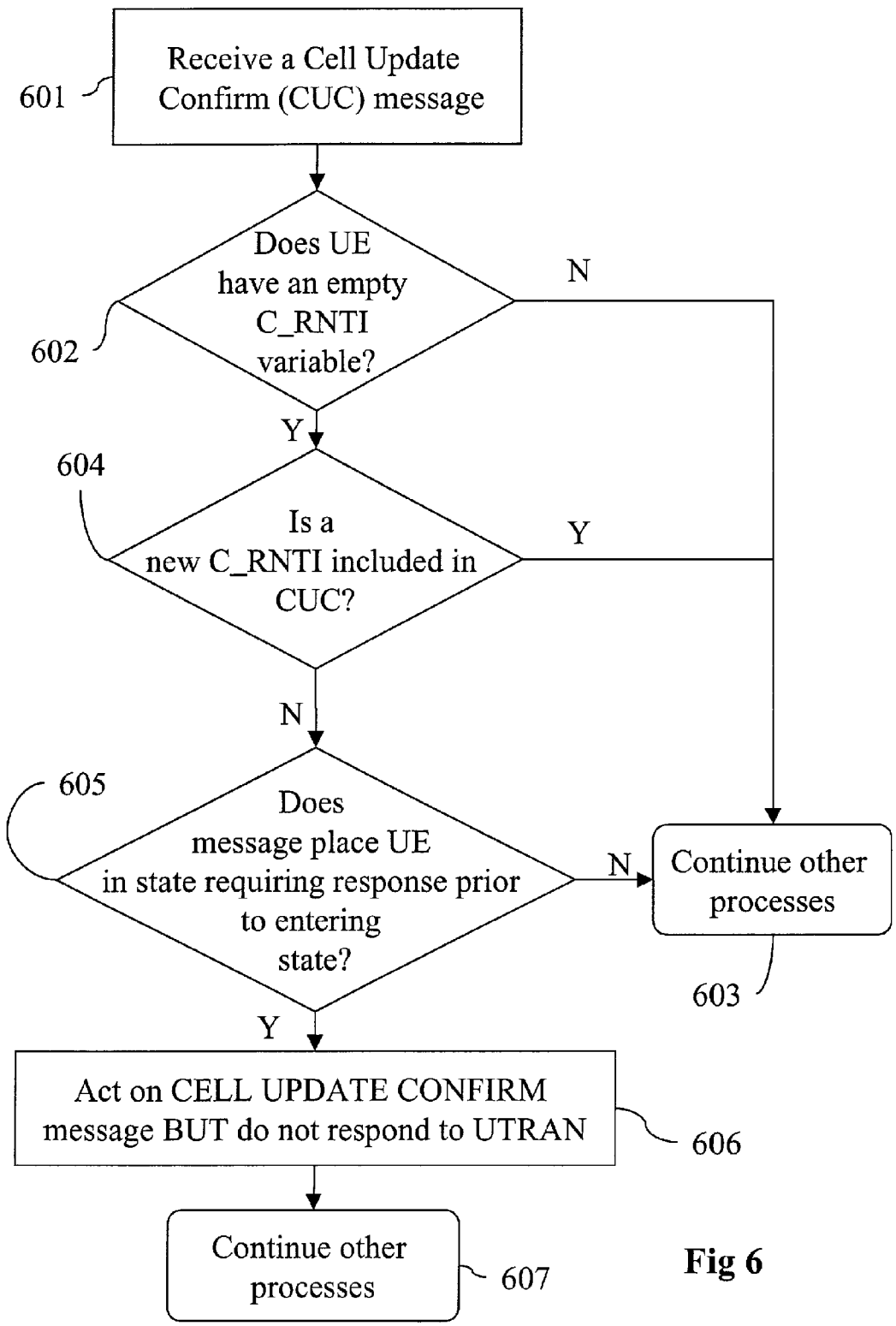
FIG. 6 is a flow chart showing a third embodiment of the system.

FIG. 6 shows a further embodiment in which steps 601 to 605 are the same as steps 401 to 405 as described with reference to FIG. 4. However, when the CUC message places the UE in a state requiring response prior to entering the state, in this embodiment the UE acts on the cell update confirm message but does not respond to the UTRAN (step 606).

Figure 7:
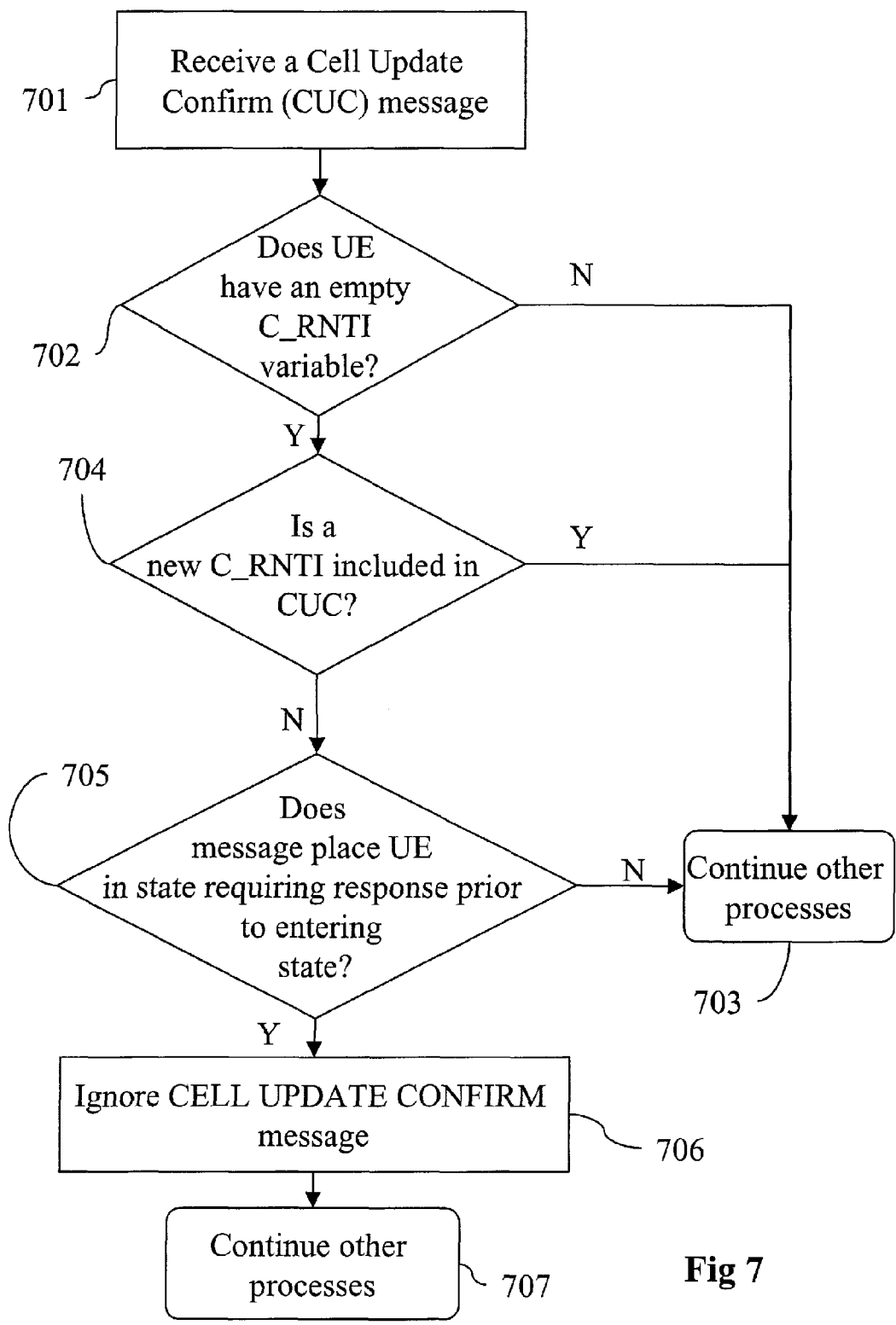
FIG. 7 is a flow chart showing a fourth embodiment of the system.

FIG. 7 shows yet a further embodiment in which step 701 to 705 correspond to steps 401 to 405 of FIG. 4. However, when the message places the UE in a state requiring a response prior to entering the state, the UE simply ignores the CUC and takes no action in response to receipt of the CUC.

Such operations in particular are applicable to ETSI Standard TS 125.331 version 3.15.0 (and other similar CDMA standards) which may be amended to implement these proposals. For instance, section 8.3.1.6 of ETSI TS 125.331 Version 3.15.0 may be amended as follows:

If the UE after state transition enters URA_PCH or CELL_PCH state, and if a response message is to be transmitted according to subclause 8.3.1.7, it should/shall:
1>if the contents of the variable C_RNTI are empty:
2>set the variable INVALID_CONFIGURATION to TRUE.

An alternative amendment to the standard is as follows:
If the UE after state transition enters URA_PCH or CELL_PCH state, and if a response message is to be transmitted according to subclause 8.3.1.7; and 1>the contents of the variable C_RNTI are empty:
the UE shall check the value of V302 and continue.

In the first of these situations, rather than accepting a CUC command, CUC processing by the UE is aborted and the variable INVALID_CONFIGURATION is set to TRUE. This results in a subsequent cell update message being sent to the UTRAN or the UE returning to idle depending on the values of V302 and N302 as described in Section 8.3.1.9 of the standard. Thus, on receipt of the cell update confirm message, it is determined whether the message contains a C-RNTI and whether the message places the UE in a state that requires a response prior to entering the state. If both of these are true, the processing of the cell update confirm message may be aborted and the variable INVALID_CONFIGURATION be set to TRUE. A subsequent cell update message may be sent to the UTRAN or other processes as described above.

In the alternative, on receipt of a cell update confirm message, when it is determined that the message does not contain a C-RNTI and it is determined that the variable C_RNTI is empty. If so it is determined whether the message places the UE in a state which requires response prior to entering that state. If it does, the cell update confirm message is processed by the UE and the UE then continues with the further processes for example sending subsequent cell update message to the UTRAN or returning to idle depending on the values of V302 and N302 as described in Section 8.3.1.6 of the standard for the case where CUC places the UE in Cell_FACH with the variable C_RNTI empty.

It is to be noted that the methods as described have shown steps being carried out in a particular order. However, it would be clear to a person skilled in the art that the order of the evaluation is immaterial with respect to the operation of the method. For instance, the device may check whether a C-RNTI is included in the CUC and/or whether the message places the UE in a state requiring a response prior to entering the state before determining whether the UE has an empty C_RNTI variable. The ordering of the steps as described herein is not intended to be limiting.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Any features as claimed may be used in combination or separately.

The invention claimed is:

1. A method in a mobile telecommunications user equipment (UE), the method comprising:
    receiving a Cell Update Confirm (CUC) message at the UE;
    when the CUC message excludes a value for a cell identifier, the UE has no stored value for the cell identifier and the CUC message would cause the UE to enter a state which requires the UE to respond to the message before entering the state, carrying out at least one further operation instead of sending a response message indicating successful processing of the CUC message.

2. A method according to claim 1 wherein the further operation comprises:
    setting INVALID_CONFIGURATION to TRUE.

3. A method according to claim 2 wherein the further operation further comprises:
    the UE sending a cell update message to a network.

4. A method according to claim 2 wherein the further operation further comprises:
    returning the UE to an idle state.

5. A method according to claim 1 wherein the further operation comprises:
    sending a new cell update message including a field that indicates that the cause for the cell update message is cell reselection.

6. A method according to claim 1 wherein the further operation comprises:
    acting on the CUC message without transmitting a response to the network.

7. A method according to claim 1 wherein the further operation comprises:
    ignoring the CUC message.

8. A method according to any preceding claim wherein the cell identifier is C_RNTI and the value of the cell identifier is C-RNTI.

9. A non-transitory computer readable medium configured to carry out the operation of the method as claimed in claim 1.

10. A mobile telecommunications user equipment (UE) comprising:
    the UE being arranged to receive a Cell Update Confirm (CUC) message; and
    when the CUC message excludes a value for a cell identifier, the UE has no stored value for the cell identifier, and the CUC message would cause the UE to enter a state which requires the UE to respond to the message before entering the state, the UE being arranged to carry out at least one further operation instead of sending a response message indicating successful processing of the CUC message.

11. A UE according to claim 10 wherein the UE is further arranged to:
    set INVALID_CONFIGURATION to TRUE.

12. A UE according to claim 11 wherein the UE is further arranged to:
    send a cell update message to a network.

13. A UE according to claim 10 wherein the UE is further arranged to:
    return to an idle state.

14. A UE according to claim 10 wherein the UE is further arranged to:
    send a new cell update message including a field that indicates that the cause for the cell update message is cell reselection.

15. A UE according to claim 10 wherein the UE is further arranged to:
    act on the CUC message without transmitting a response to the network.

16. A UE according to claim 10 wherein the UE is further arranged to:
    ignore the CUC message.

17. A mobile telecommunication device incorporating a UE according to claim 10.

* * * * *